(12) United States Patent
Kato (10) Patent No.: US 11,203,546 B2
(45) Date of Patent: Dec. 21, 2021

(54) GLASS FLAKES AND RESIN COMPOSITION

(71) Applicant: Nippon Sheet Glass Company, Limited, Tokyo (JP)

(72) Inventor: Shinichi Kato, Mie (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/609,698

(22) PCT Filed: May 22, 2018

(86) PCT No.: PCT/JP2018/019612
§ 371 (c)(1),
(2) Date: Oct. 30, 2019

(87) PCT Pub. No.: WO2018/221313
PCT Pub. Date: Dec. 6, 2018

(65) Prior Publication Data
US 2020/0055767 A1    Feb. 20, 2020

(30) Foreign Application Priority Data

May 29, 2017 (JP) .............................. JP2017-105364

(51) Int. Cl.
*C03B 37/005* (2006.01)
*C08L 23/06* (2006.01)
(Continued)

(52) U.S. Cl.
CPC ............ *C03B 37/005* (2013.01); *C08L 23/06* (2013.01); *C08L 23/0815* (2013.01); *C08L 23/12* (2013.01);
(Continued)

(58) Field of Classification Search
CPC .... C03B 37/005; C08L 23/06; C08L 23/0815; C08L 23/12; C08L 23/16; C08L 23/20; C08L 25/08; C08L 69/00
See application file for complete search history.

(56) References Cited

U.S. PATENT DOCUMENTS 3,257,184 A    6/1966   Glaser
8,383,531 B2   2/2013   Fujiwara et al.
(Continued)

FOREIGN PATENT DOCUMENTS

EP    2664317     11/2013
JP    S41017148   9/1966
(Continued)

OTHER PUBLICATIONS

Extended European Search Report issued for European Patent Application No. 18810073.9, dated Sep. 18, 2020, 7 pages.
(Continued)

*Primary Examiner* — John E Uselding
(74) *Attorney, Agent, or Firm* — Hamre, Schumann, Mueller & Larson, P.C.

(57) ABSTRACT

Glass flakes of the present invention have an average particle diameter of 0.1 to 15 μm and an average thickness of 0.1 to 2 μm. The glass flakes have a particle size distribution in which the particle diameter at 99% of the cumulative volume from the smaller particle diameter is 45 μm or less, and the maximum particle diameter of the glass flakes is 62 μm or less.

6 Claims, 2 Drawing Sheets

(51) Int. Cl.
    *C08L 23/08*     (2006.01)
    *C08L 23/12*     (2006.01)
    *C08L 23/16*     (2006.01)
    *C08L 23/20*     (2006.01)
    *C08L 25/08*     (2006.01)
    *C08L 69/00*     (2006.01)
    *C08K 3/40*     (2006.01)
    *C08K 9/06*     (2006.01)

(52) U.S. Cl.
    CPC ............... *C08L 23/16* (2013.01); *C08L 23/20* (2013.01); *C08L 25/08* (2013.01); *C08L 69/00* (2013.01); *C08K 3/40* (2013.01); *C08K 9/06* (2013.01)

(56) References Cited

U.S. PATENT DOCUMENTS

| | | | |
|---|---|---|---|
| 2008/0071020 A1* | 3/2008 | Kobayashi | C08K 7/00 524/494 |
| 2009/0274735 A1 | 11/2009 | Wakamiya | |
| 2010/0116169 A1* | 5/2010 | Kaupp | C03C 12/00 106/31.9 |
| 2015/0337110 A1 | 11/2015 | Tai | |
| 2017/0036376 A1* | 2/2017 | Kurokawa | B29C 48/305 |
| 2018/0155534 A1 | 6/2018 | Kato et al. | |
| 2018/0162764 A1 | 6/2018 | Kato | |

FOREIGN PATENT DOCUMENTS

| | | |
|---|---|---|
| JP | S45003541 | 2/1970 |
| JP | S5921533 | 2/1984 |
| JP | H02124732 | 5/1990 |
| JP | H02503669 | 11/1990 |
| WO | 8808412 | 11/1988 |
| WO | 2006068255 | 6/2006 |
| WO | 2007114442 | 10/2007 |
| WO | 2012096182 | 7/2012 |
| WO | 2016083797 | 6/2016 |
| WO | 2017022180 | 2/2017 |
| WO | 2017022181 | 2/2017 |

OTHER PUBLICATIONS

International Search Report and Written Opinion issued for International Patent Application No. PCT/JP2018/019612, dated Aug. 21, 2018, 8 pages including English translation of Search Report.

* cited by examiner

GLASS FLAKES AND RESIN COMPOSITION

TECHNICAL FIELD

The present invention relates to glass flakes and a resin composition including the glass flakes.

BACKGROUND ART

For resin molded articles, it is commonly known that glass fibers, carbon fibers, mica, glass beads, glass flakes or the like are added as a filler to a matrix resin to achieve reduction in warping and deformation and/or enhancement of mechanical strength.

For such a resin molded product, it has been considered preferable to surface-treat the filler with a silane coupling agent or the like to enhance the adhesion between the matrix resin and filler and thereby further increase the mechanical strength of the resin molded article. For example, in Patent Literature 1, a resin composition including glass flakes surface-treated with a treatment agent containing a silane coupling agent and given resin is proposed as a resin composition from which resin molded articles having high mechanical strength can be obtained.

CITATION LIST

Patent Literature

Patent Literature 1: WO 2017/022180 A1

SUMMARY OF INVENTION

Technical Problem

As described above, the use of a resin composition in which a certain treatment agent is used for surface treatment of a filler enhances the adhesion between a matrix resin and filler and thereby increases the mechanical strength of the resultant resin molded article to some degree. However, there has been a problem with a resin composition including glass flakes as its filler in that such a resin composition has a very low impact strength compared to a resin composition including a fibrous filler such as glass fibers. Therefore, the resin composition including glass flakes as its filler has a problem in that it is difficult to include such a resin composition into a resin molded article required to have a high impact strength.

It is therefore an object of the present invention to provide glass flakes capable, when used as a filler for reinforcing a resin molded article, of improving the impact strength of the resultant resin molded article. Another object of the present invention is to provide a resin composition that includes such glass flakes and from which a resin molded article having high impact strength can be obtained.

Solution to Problem

The present invention provides glass flakes having an average particle diameter of 0.1 to 15 µm and an average thickness of 0.1 to 2 µm, wherein the glass flakes have a particle size distribution in which the particle diameter at 99% of the cumulative volume from the smaller particle diameter is 45 µm or less, and the maximum particle diameter of the glass flakes is 62 µm or less.

The present invention also provides a resin composition including the above glass flakes of the present invention and a matrix resin.

Advantageous Effects of Invention

The glass flakes of the present invention are capable, when used as a filler for reinforcing a resin molded article, of improving the impact strength of the resultant resin molded article. The resin composition of the present invention, which includes such glass flakes of the present invention, can be used to obtain a resin molded article having high impact strength.

DESCRIPTION OF EMBODIMENTS

Hereinafter, embodiments of glass flakes and a resin composition of the present invention will be described in detail.

Glass flakes of the present embodiment has an average particle diameter of 0.1 to 15 µm and an average thickness of 0.1 to 2 µm. Additionally, the glass flakes of the present embodiment have a particle size distribution in which the particle diameter at 99% of the cumulative volume from the smaller particle diameter is 45 µm or less, and the maximum particle diameter of the glass flakes is 62 µm or less. The glass flakes of the present embodiment are capable, when used as a filler for reinforcing a resin molded article, of improving the impact strength of the resultant resin molded article.

A resin composition of the present embodiment includes the above glass flakes of the present embodiment and a matrix resin. Since the resin composition of the present embodiment includes the glass flakes of the present embodiment having the above characteristics as a filler, a resin molded article having high impact strength can be obtained from the resin composition of the present embodiment. Moreover, including the glass flakes of the present embodiment having the above characteristics as a filler, the resin composition of the present embodiment can impart good appearance and good surface smoothness to a resin molded article to be obtained.

The average particle diameter of the glass flakes of the present embodiment is, as described above, 0.1 to 15 µm, and preferably 1 to 12 µm. The average particle diameter of the glass flakes is herein the particle diameter at 50% (D50) of the cumulative volume from the smaller particle diameter in a particle size distribution measured by a laser diffraction-scattering method.

The average thickness of the glass flakes of the present embodiment is, as described above, 0.1 to 2 µm, and preferably 0.3 to 1.5 µm. The average thickness of the glass flakes is herein a value determined by extracting 100 or more glass flakes, measuring the thickness thereof with a scanning electron microscope (SEM), and dividing the sum of the thickness values by the number of the glass flakes.

The glass flakes of the present embodiment have a particle size distribution in which the particle diameter at 99% (D99) of the cumulative volume from the smaller particle diameter is, as described above, 45 µm or less, and preferably 40 µm or less. The lower limit of D99 is, for example, but not particularly limited to, 20 μm or more. Additionally, the maximum particle diameter of the glass flakes of the present embodiment is, as described above, 62 μm or less, and preferably 57 μm or less. The term "maximum particle diameter" as used herein refers to the particle diameter at 100% of the cumulative volume in the above particle size distribution of the glass flakes. A particle size distribution is an index indicating the size (particle diameter) of particles included in a group of particles measured and the proportion of the particles of each size, and is measured herein by a laser diffraction-scattering method. In the particle size distribution herein, the amount of particles is measured by volume.

It has been thought that generally, a resin molded article having higher impact strength can be obtained from a resin composition in which glass flakes having larger particle diameters are added to a matrix resin. However, contrary to such an idea, it has been confirmed as a result of intensive studies by the present inventor that a resin molded article having high impact strength can be obtained from a resin composition in which glass flakes having relatively small diameters and having the above particle diameter characteristics (the average particle diameter range, D99 range, and maximum particle diameter range defined for the glass flakes in the present embodiment) are included. It is unknown why the resin molded article having high impact strength can be obtained by including the glass flakes having small diameters and having the above particle diameter characteristics. However, for example, when the matrix resin is a thermoplastic resin, one possible reason is that inclusion of the glass flakes having small particle diameters results in alignment of molecules of the thermoplastic resin at the time of solidification of the thermoplastic resin on the glass surface. When the matrix resin is a crystalline resin, the particle diameter characteristics (the average particle diameter, D99, and the maximum particle diameter) of the glass flakes included therein are inferred to affect crystal growth of the crystalline resin. The size of the glass flakes is thought to be important especially when the matrix resin is polypropylene.

Commonly known glass compositions can be used as the composition of the glass flakes. Specifically, a glass with a low alkali metal oxide content, such as E-glass, can be suitably used. A typical composition of E-glass is shown below. In the composition, the unit is mass %.

$SiO_2$: 52 to 56
$Al_2O_3$: 12 to 16
CaO: 16 to 25
MgO: 0 to 6
$Na_2O+K_2O$: 0 to 2 (Preferably 0 to 0.8)
$B_2O_3$: 5 to 13
$F_2$: 0 to 0.5

For the glass with a low alkali metal oxide content, a glass composition including the following components in mass % and substantially free of $B_2O_3$, F, ZnO, BaO, SrO, and $ZrO_2$ can be employed:

$59 \leq SiO_2 \leq 65$,
$8 \leq Al_2O_3 \leq 15$,
$47 \leq (SiO_2 - Al_2O_3) \leq 57$,
$1 \leq MgO \leq 5$,
$20 \leq CaO \leq 30$,
$0 < (Li_2O + Na_2O + K_2O) < 2$, and
$0 \leq TiO_2 \leq 5$.

This glass composition is disclosed by the present applicant in WO 2006/068255 A1.

Being "substantially free" means that the components are not included intentionally except for those inevitably introduced from, for example, industrial materials. Specifically, being "substantially free" means that the content of each of $B_2O_3$, F, ZnO, BaO, SrO, and $ZrO_2$ is less than 0.1 mass % (preferably less than 0.05 mass % and more preferably less than 0.03 mass %).

The glass flakes of the present embodiment can be produced, for example, by so-called blow process as disclosed in JP S41(1966)-017148 B or JP S45(1970)-003541 B or so-called rotary process as disclosed in JP S59(1984)-021533 A or JP 1102(1990)-503669 A.

Figure 1:
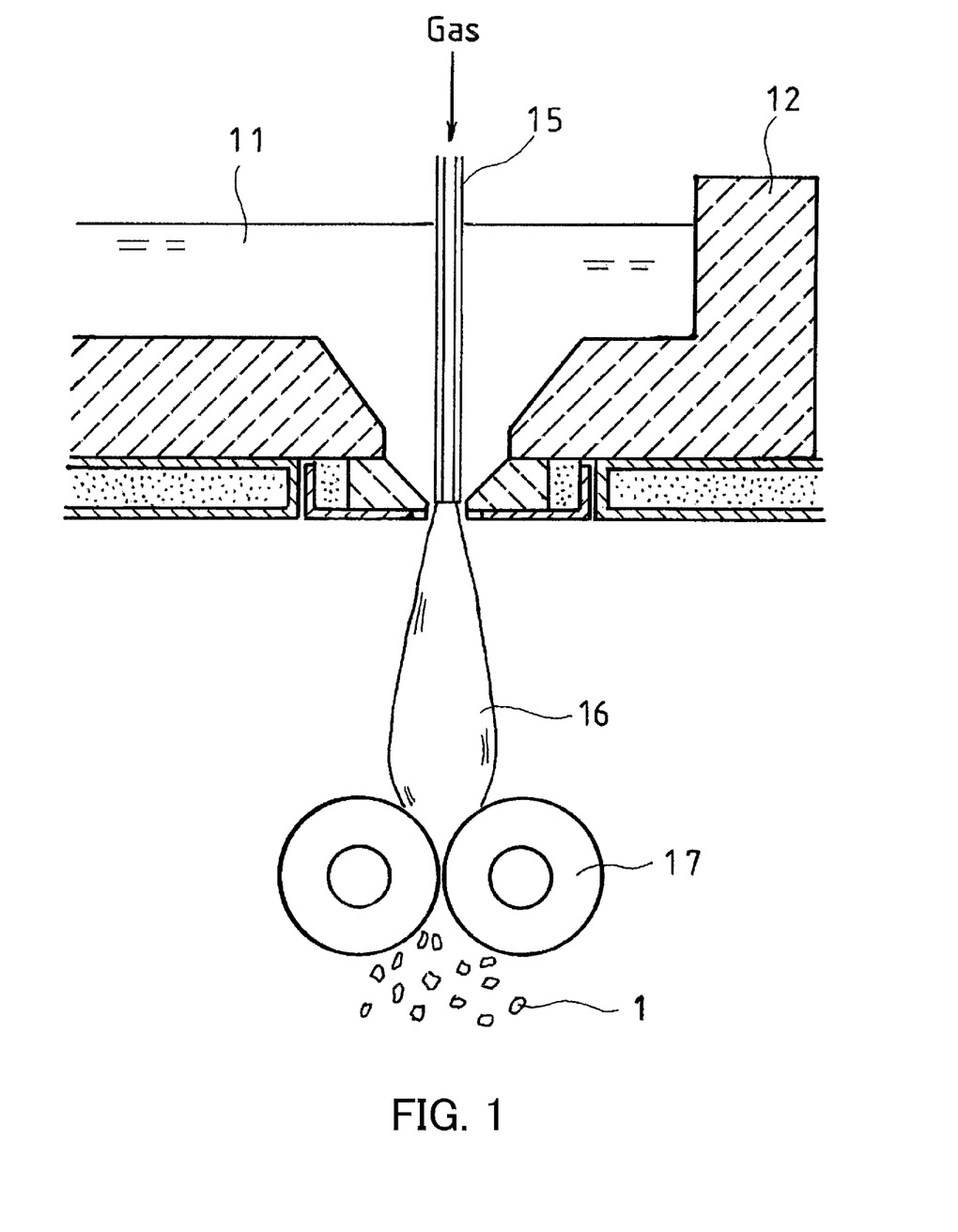
FIG. 1 is a schematic diagram illustrating an exemplary apparatus for producing glass flakes.

For the blow process, a glass production apparatus shown in FIG. 1 can be employed. The glass production apparatus is equipped with a refractory tank furnace 12, blowing nozzle 15, and pressing rolls 17. A glass raw material 11 is melted in the refractory tank furnace 12 (melting furnace) and is inflated into a balloon by a gas delivered through the blowing nozzle 15, so that hollow glass 16 is obtained. The hollow glass 16 is crushed by the pressing rolls 17 to obtain glass flakes 1. The thickness of the glass flakes 1 can be controlled by adjusting, for example, the speed of pulling the hollow glass 16 and flow rate of the gas delivered through the blowing nozzle 15.

Figure 2:
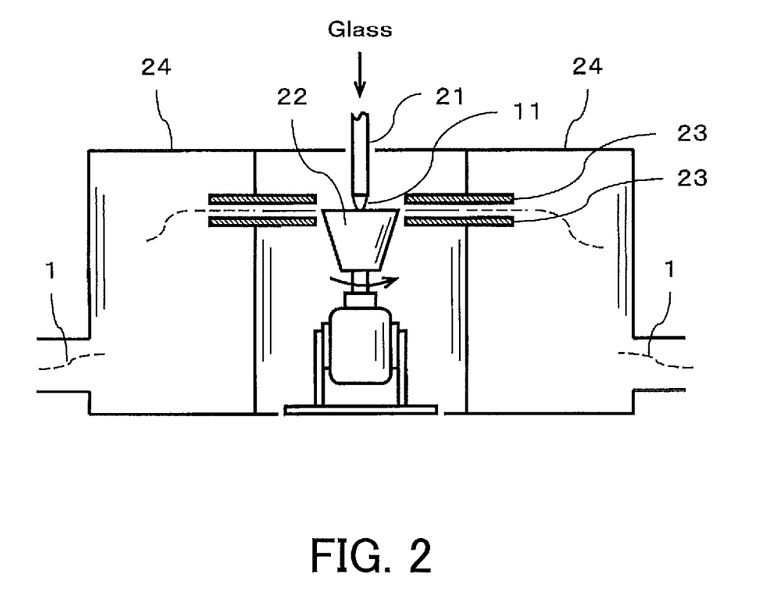
FIG. 2 is a schematic diagram illustrating another exemplary apparatus for producing glass flakes.

For the rotary process, a glass production apparatus shown in FIG. 2 can be employed. The glass production apparatus is equipped with a rotary cup 22, pair of annular plates 23, and annular cyclone collector 24. A molten glass raw material 11 is poured into the rotary cup 22, centrifugally flows out from the upper edge of the rotary cup 22 in a radial manner, and is then drawn and carried into the annular cyclone collector 24 through the gap between the annular plates 23 by airflow. While passing through the annular plates 23, the glass is cooled and solidified into a thin film, which is then crushed into fine pieces to give glass flakes 1. The thickness of the glass flakes 1 can be controlled by adjusting, for example, the distance between the annular plates 23 and velocity of the airflow.

At least a portion of a surface of each of the glass flakes may be covered by a surface treatment agent The surface treatment agent includes at least one selected from the group consisting of, for example, a binder component and a silane coupling agent.

The binder component included in the surface treatment agent is not particularly limited, and a known binder component used for a surface treatment of glass flakes can be used as appropriate. Examples of organic binder components include methylcellulose, carboxymethyl cellulose, starch, carboxymethyl starch, hydroxyethyl cellulose, hydroxypropyl cellulose, polyvinyl alcohol, acrylic resins, epoxy resins, epoxy-modified polyolefin resins, phenolic resins, vinyl acetate, and urethane resins. Examples of inorganic binder components include liquid glass, colloidal silica, and colloidal alumina.

When an epoxy-modified polyolefin resin is used as the binder component, the epoxy-modified polyolefin resin is preferably a polyolefin-glycidyl methacrylate copolymer, polyolefin-allyl glycidyl ether copolymer, and/or copolymer composed of a polyolefin on which glycidyl methacrylate or allyl glycidyl ether has been grafted under action of an organic peroxide. An ethylene-glycidyl methacrylate copolymer (in particular, an ethylene-glycidyl methacrylate graft copolymer) including ethylene and glycidyl methacrylate as essential components is suitably used as the epoxy-modified polyolefin resin. However, the epoxy-modified polyolefin resin is not limited to the above copolymers, and other examples of resins that can be used include an ethylene-vinyl acetate-glycidyl methacrylate copolymer, ethylene-methyl acrylate-glycidyl methacrylate copolymer, ethylene-ethyl acrylate-glycidyl methacrylate copolymer, ethylene-butyl acrylate-glycidyl methacrylate copolymer, ethylene-acrylic acid-acrylic acid ester-glycidyl methacrylate copolymer, ethylene-methacrylic acid ester-glycidyl methacrylate copolymer, ethylene-methacrylic acid-methacrylic acid ester copolymer-glycidyl methacrylate copolymer, ethylene-polypropylene copolymer-glycidyl methacrylate graft copolymer, ethylene-vinyl acetate copolymer-glycidyl methacrylate graft copolymer, polypropylene-glycidyl methacrylate copolymer, and polypropylene-glycidyl methacrylate graft copolymer.

Examples of the silane coupling agent include γ-aminopropyltriethoxysilane, γ-aminopropyltrimethoxysilane, γ-ureidopropyltriethoxysilane, γ-glycidoxypropyltrimethoxysilane, vinyltriethoxysilane, and γ-methacryloxypropyltrimethoxysilane. Among these, γ-aminopropyltriethoxysilane, γ-aminopropyltrimethoxysilane, and γ-ureidopropyltriethoxysilane are suitably used. A titanium coupling agent, aluminum coupling agent, or zirconia coupling agent can be used in addition to the silane coupling agent.

The surface treatment agent may, if necessary, include another component in addition to the binder component and silane coupling agent described above. The surface treatment agent may further include a crosslinking agent.

The surface treatment agent may, if necessary, include another component such as a urethane resin, surfactant, and/or anti-foaming agent in addition to the components described above.

The method for covering the surface of the glass flakes with the surface treatment agent is not particularly limited, and a known method can be used. A solution of the surface treatment agent is, for example, added to the glass flakes, which are stirred and then dried to produce the glass flakes having a surface at least a portion of which is covered by the surface treatment agent. The method for accomplishing the addition of the surface treatment agent solution, stirring, and drying is not limited to specific ones. Examples of the method will be described hereinafter.

For example, the glass flakes are fluidized in a mixer such as a rotary disk mixer or Henschel mixer having a mixing vessel equipped with a rotating blade, a predetermined amount of a binder is added to the flowing glass flakes by a means such as a spray, and the glass flakes and binder are mixed and stirred. Then, the glass flakes are dried under stirring in the mixer, or the glass flakes are taken out of the mixer and dried. In this manner, the glass flakes covered by the surface treatment agent can be obtained.

In another example, the glass flakes with a coating can be produced by tumbling granulation as described in JP H02 (1990)-124732 A. That is, granulation may be performed by placing the glass flakes in a horizontal oscillating granulator equipped with a stirring blade and spraying the surface treatment agent solution onto the glass flakes.

The glass flakes can be produced also by using known methods other than the above examples, such as methods generally called stirring granulation, fluidized bed granulation, injection granulation, and rotary granulation.

The drying step is accomplished, for example, by heating the glass flakes to a temperature equal to or higher than the boiling point of the solvent used in the surface treatment agent solution and drying the glass flakes until the solvent fully evaporates.

The proportion of the surface treatment agent in the glass flakes can be controlled by, for example, adjusting the concentration of the surface treatment agent in the surface treatment agent solution to be added or sprayed. That is, the glass flakes having a predetermined proportion of a coating composed of the surface treatment agent can be produced by adding or spraying a predetermined amount of the surface treatment agent solution onto a predetermined amount of the glass flakes so that a predetermined amount of the surface treatment agent is adhered to the glass flakes.

The proportion of the coating composed of the surface treatment agent in the glass flakes is, for example, 0.05 to 3 mass %, desirably 0.2 to 2 mass %, and more desirably 0.3 to 1 mass %. If the proportion of the coating is less than 0.05 mass %, covering of the glass flakes by the surface treatment agent may be insufficient, and the insufficient covering can cause a decrease in the strength of the resultant resin molded article. If the proportion of the coating is more than 3 mass %, extrusion molding may involve generation of a gas which causes problems such as fouling of the mold or discoloration of the resultant resin molded article. If the proportion of the coating is more than 3 mass %, the binding force between the glass flakes themselves may be so increased that insufficient kneading during resin molding can cause the glass flakes to remain as aggregates in the resultant resin molded article, thus leading to a decrease in the strength of the resultant resin molded article. Furthermore, if the proportion of the coating is more than 3 mass %, the components of the excess coating may impair the adhesion between the glass and matrix resin and thus cause a failure to achieve good properties of the resultant molded article.

Next, the matrix resin of the resin composition of the present embodiment will be described.

The matrix resin may be, for example, a thermoplastic resin. The thermoplastic resin may be at least one selected from the group consisting of polypropylene, polyethylene, polybutylene terephthalate, polyethylene terephthalate, polycarbonate, a polystyrene resin, a styrene-acrylonitrile copolymer resin, a polyacrylate, a styrene-butadiene-acrylonitrile copolymer resin, polyarylene sulfide, polyphenylene sulfide, polyacetal, polyamide, polyamide-imide, a liquid crystal polymer, and polyetheretherketone. The glass flakes of the present embodiment can exhibit high reinforcing effect on a resin molded article especially when a polyolefin is used as the matrix resin. In particular, when the polyolefin used is polypropylene, the resin-reinforcing filler of the present embodiment can exhibit higher reinforcing effect. Moreover, the glass flakes of the present embodiment can exhibit high reinforcing effect on a resin molded article also when polycarbonate is used as the matrix resin.

The content of the glass flakes in the resin composition is preferably 3 to 70 mass %. Controlling the content to 3 mass % or more allows the glass flakes to fully exhibit their function as a reinforcing material. Controlling the content to 70 mass % or less makes it possible to uniformly disperse the glass flakes in the resin composition. To further reduce the mold shrinkage factor, the content of the glass flakes is more preferably 10 mass % or more and 50 mass % or less.

The resin composition may include another component in addition to the matrix resin and glass flakes. Examples of the other component include a filler, such as carbon black, and thermoplastic elastomers. Examples of the thermoplastic elastomer include an olefin elastomer, styrene elastomer and hydrogenated polymer elastomer. Examples of the olefin elastomer include an ethylene-α-olefin copolymer elastomer (such as an ethylene-propylene copolymer elastomer (EPR), ethylene-butene copolymer elastomer (EBR), ethylene-hexene copolymer elastomer (EHR), and ethylene-octene copolymer elastomer (EOR)) and ethylene-α-olefin-diene terpolymer elastomer (such as an ethylene-propylene-ethylidene norbornene copolymer, ethylene-propylene-butadiene copolymer, and ethylene-propylene-isoprene copolymer). Two or more thermoplastic elastomers can be used in combination.

By virtue of the reinforcing effect of the glass flakes, a resin molded article produced using the resin composition of the present embodiment can achieve high impact strength.

EXAMPLES

Hereinafter, the present invention will be described in more detail using examples. The present invention is not limited to the examples given below.

Example 1

(Glass Flakes)

First, E-glass having a composition shown in Table 1 was used to produce glass flakes by a blow process as described with reference to FIG. 1. Specifically, the E-glass was placed and melted in a melting furnace heated to 1200° C. or higher. Air was blown from a nozzle into the molten glass to form thin glass, and this thin glass was continuously pulled out by rollers. The amount of the blown air and the rotation speed of the rollers were controlled to give glass with an average thickness of 0.4 µm. Afterwards, the glass was crushed, and the crushed glass was classified to give glass flakes having an average particle diameter of 10 µm. Glass flakes with a uniform size can be obtained by crushing into glass flakes, followed by classification of the glass flakes by means of a sieve having an appropriate opening size. Additionally, a particle size distribution of the obtained glass flakes was measured with a laser diffraction-scattering particle size distribution analyzer ("Microtrac MT3000" manufactured by MicrotracBEL Corp.) to determine the particle diameter at 50% (D50) of the cumulative volume from the smaller particle diameter as the average particle diameter. The result is shown in Table 2.

TABLE 1

| | (Unit: mass %) E-glass |
|---|---|
| $SiO_2$ | 54.7 |
| $Al_2O_3$ | 14.0 |
| CaO | 23.4 |
| MgO | 0.3 |
| $Na_2O$ | 0.4 |
| $K_2O$ | 0.2 |
| $B_2O_3$ | 5.8 |
| Others | 1.2 |

Next, 5 kg of these glass flakes was placed in a Henschel mixer. While a surface treatment agent solution was being added by spraying, the contents of the mixer were mixed and stirred for 15 minutes. The surface treatment agent (solid) contained in the surface treatment agent solution included an ethylene-glycidyl methacrylate copolymer (glycidyl methacrylate content: about 15 mass %) as a binder component and γ-aminopropyltriethoxysilane as a silane coupling agent. In the solids of the surface treatment agent solution, the content of the binder component was 50 mass % and that of the silane coupling agent was 50 mass %. The solvent used in the surface treatment agent solution was water. Subsequently, the glass flakes (undried) were taken out of the mixer and dried by a dryer at 125° C. for 8 hours. Glass flakes of Example 1 were thus obtained.

The proportion of the deposited surface treatment agent (the proportion of the coating composed of the surface treatment agent in the glass flakes) in the obtained glass flakes was examined by loss on ignition. Specifically, a proper amount of the glass flakes was dried at 110° C., and then heated in an atmosphere at 625° C. to remove the surface treatment agent from the surface of the glass flakes. The proportion of the deposited surface treatment agent in the glass flakes was calculated from the difference between the mass of the glass flakes before the heating and the mass of the glass flakes after the heating. The result is shown in Table 2.

(Resin Molded Article)

The glass flakes of Example 1, polypropylene (NOVATEC BC06C manufactured by Japan Polypropylene Corporation), a thermoplastic elastomer (ethylene-octene copolymer elastomer) (ENGAGE 8200 manufactured by The Dow Chemical Company), and a fine carbon black powder in amounts of 30 mass %, 54 mass %, 14 mass %, and 2 mass %, respectively, were mixed uniformly. The resultant mixture was kneaded by an extrusion molding machine (KZW15-30 MG manufactured by Technovel Corporation, molding temperature: about 210 to 220° C.) to obtain a resin composition including polypropylene as a matrix resin and glass flakes as a reinforcing filler. The resin composition was molded by an injection molding machine (HM7 manufactured by NISSEI PLASTIC INDUSTRIAL CO., LTD.) to obtain a resin molded article. The content of the glass flakes in the obtained resin molded article was 30 mass %.

A particle size distribution of the glass flakes in the resin composition was measured with a laser diffraction-scattering particle size distribution analyzer ("Microtrac MT3000" manufactured by MicrotracBEL Corp.) to determine the particle diameter at 50% (D50), particle diameter at 90% (D90), particle diameter at 99% (D99), and particle diameter at 100% (maximum particle diameter) of the cumulative volume from the smaller particle diameter. The results are shown in Table 2.

The properties of the resin molded article were examined. The maximum tensile strength and tensile strain were measured according to JIS K 7113. The maximum flexural strength and flexural modulus were measured according to JIS K 7171. The Izod impact strength was measured according to JIS K 7111-1. The measurement results are shown in Table 2. To examine the appearance of the resin molded article, a 30-mm-square (3-mm-thick) flat plate was formed and whether reflection occurs from the glass flakes on a surface of the resin molded article was observed under natural sunlight. To examine the surface smoothness, the resin molded article was enlarged and observed at a magnification of 20 times with an optical microscope, and the smoothness of the surface of the composite was comparatively evaluated on a 5-point scale. The surface smoothness rated as 4 or greater is acceptable. To examine the scratch resistance, a metallic needle was dragged on the flat plate as used for the above appearance evaluation at 1 cm/sec under a constant load (100 N) at an angle of 30 degrees with respect to a dragging direction, and the resultant scratch (degree of whitening) was comparatively evaluated on a 5-point scale. The scratch resistance rated as 4 or greater is acceptable. The measurement results of these are shown in Table 2.

Comparative Examples 1 to 12

Resin compositions of Comparative Examples 1 to 12 were obtained in the same manner as in Example 1, except that the average thickness, average particle diameter, etc. of the glass flakes of Example 1 were changed as shown in Table 2. The average thickness, average particle diameter, etc. of the glass flakes were changed from those in Example 1 by adjusting the amount of blown air and the rotation speed of rollers in the blow process, crush, and classification. The proportion of the deposited surface treatment agent was measured in the same manner as in Example 1. Moreover, resin compositions were produced and their various properties were measured in the same manner as in Example 1. The results are shown in Table 2.

TABLE 2

|  |  | Example 1 | Comparative Example 1 | Comparative Example 2 | Comparative Example 3 | Comparative Example 4 | Comparative Example 5 | Comparative Example 6 |
|---|---|---|---|---|---|---|---|---|
| Average thickness of glass flakes (μm) | | 0.4 | 11 | 8 | 5 | 5 | 2 | 0.7 |
| Average particle diameter of glass flakes (μm) | | 10 | 600 | 600 | 600 | 160 | 160 | 160 |
| Proportion of deposited surface treatment agent (mass %) | | 0.6 | 0.6 | 0.6 | 0.6 | 0.6 | 0.6 | 0.6 |
| Content of coupling agent in surface treatment agent (mass %) | | 50 | 50 | 50 | 50 | 50 | 50 | 50 |
| Content of binder component in surface treatment agent (mass %) | | 50 | 50 | 50 | 50 | 50 | 50 | 50 |
| D50 value of glass flakes in resin composition (μm) | | 9 | 186 | 176 | 153 | 150 | 81 | 43 |
| D90 value of glass flakes in resin composition (μm) | | 21 | 360 | 346 | 289 | 291 | 183 | 76 |
| D99 value of glass flakes in resin composition (μm) | | 39 | >704 | >704 | >704 | >704 | 419 | 136 |
| Maximum particle diameter of glass flakes in resin composition (μm) | | 57 | >704 | >704 | >704 | >704 | 592 | 209 |
| Content of glass flakes in resin composition (mass %) | | 30 | 30 | 30 | 30 | 30 | 30 | 30 |
| Properties of molded article | Maximum tensile strength (MPa) | 25.7 | 21.7 | 23.1 | 25.4 | 22.8 | 26.8 | 31.9 |
| | Tensile strain (%) | 4.4 | 3.0 | 2.9 | 2.7 | 2.9 | 3.2 | 3.7 |
| | Maximum flexural strength (MPa) | 44.2 | 39.0 | 41.6 | 46.9 | 40.8 | 47.8 | 57.5 |
| | Flexural modulus (MPa) | 2020 | 2030 | 2398 | 2804 | 2180 | 2753 | 3384 |
| | Izod impact strength UN[*1] (kJ/m$^2$) | 66 | 22 | 20 | 21 | 21 | 25 | 34 |
| | Izod impact strength N[*2] (kJ/m$^2$) | 5.0 | 4.5 | 4.5 | 3.8 | 4.4 | 4.2 | 3.8 |
| | Appearance (reflection from flakes) | Not reflected | Reflected | Reflected | Reflected | Reflected | Reflected | Not reflected |
| | Surface smoothness[*3] | 4 | 1 | 1 | 1 | 1 | 1.5 | 2 |
| | Scratch resistance[*4] | 4 | 1 | 1 | 1 | 1 | 2 | 2 |

|  |  | Comparative Example 7 | Comparative Example 8 | Comparative Example 9 | Comparative Example 10 | Comparative Example 11 | Comparative Example 12 |
|---|---|---|---|---|---|---|---|
| Average thickness of glass flakes (μm) | | 0.7 | 0.7 | 0.7 | 0.55 | 0.55 | 0.4 |
| Average particle diameter of glass flakes (μm) | | 80 | 40 | 20 | 160 | 40 | 25 |
| Proportion of deposited surface treatment agent (mass %) | | 0.6 | 0.6 | 0.6 | 0.6 | 0.6 | 0.6 |
| Content of coupling agent in surface treatment agent (mass %) | | 50 | 50 | 50 | 50 | 50 | 50 |
| Content of binder component in surface treatment agent (mass %) | | 50 | 50 | 50 | 50 | 50 | 50 |
| D50 value of glass flakes in resin composition (μm) | | 42 | 31 | 19 | 38 | 29 | 20 |
| D90 value of glass flakes in resin composition (μm) | | 74 | 59 | 50 | 68 | 54 | 38 |
| D99 value of glass flakes in resin composition (μm) | | 136 | 105 | 96 | 136 | 96 | 68 |
| Maximum particle diameter of glass flakes in resin composition (μm) | | 176 | 148 | 148 | 209 | 125 | 105 |
| Content of glass flakes in resin composition (mass %) | | 30 | 30 | 30 | 30 | 30 | 30 |
| Properties of molded article | Maximum tensile strength (MPa) | 29.9 | 29.4 | 27 | 32.7 | 30 | 27.3 |
| | Tensile strain (%) | 3.8 | 4.2 | 4.4 | 3.5 | 4.2 | 4.5 |
| | Maximum flexural strength (MPa) | 53.1 | 50.3 | 46.2 | 59.1 | 52.2 | 47.8 |
| | Flexural modulus (MPa) | 2990 | 2654 | 2187 | 3459 | 2846 | 2362 |

TABLE 2-continued

|  |  |  |  |  |  |  |
|---|---|---|---|---|---|---|
| Izod impact strength UN*[1] (kJ/m$^2$) | 37 | 41 | 43 | 37 | 42 | 52 |
| Izod impact strength N*[2] (kJ/m$^2$) | 3.8 | 4.5 | 4.5 | 4.0 | 4.4 | 4.7 |
| Appearance (reflection from flakes) | Not reflected | Not reflected | Not reflected | Not reflected | Not reflected | Not reflected |
| Surface smoothness*[3] | 3 | 3 | 4 | 2.5 | 3 | 4 |
| Scratch resistance*[4] | 2.5 | 3 | 3.5 | 2 | 3 | 3.5 |

Notes
*[1]Un-notched
*[2]Notched
*[3,4]The surface smoothness and scratch resistance were evaluated on a 5-point scale and those rated as 4 or greater are acceptable.

Examples 2 to 9 and Comparative Example 13

Glass flakes of Examples 2 to 6 and Comparative Example 13 were obtained in the same manner as in Example 1, except that the average thickness, average particle diameter, etc. were changed as shown in Table 3. Glass flakes of Examples 7 to 9 were produced in the same manner as in Example 1, except that the average thickness, average particle diameter, etc. were changed as shown in Table 3 and the surface treatment with the surface treatment agent was not performed. Resin compositions of Examples 2 to 9 and Comparative Example 13 were produced in the same manner as in Example 1, except that the content of the glass flakes was changed to 20 mass %. The average thickness, average particle diameter, etc. of the glass flakes were changed from those in Example 1 by adjusting the amount of blown air and the rotation speed of rollers in the blow process, crush, and classification. Resin molded articles were produced in the same manner as in Example 1 using the resin compositions of Examples and Comparative Example. The various properties of the glass flakes, resin compositions, and resin molded articles were measured in the same manner as in Example 1. The results are shown in Table 3.

TABLE 3

|  | Example 2 | Example 3 | Example 4 | Example 5 | Example 6 | Example 7 | Example 8 | Example 9 | Comparative Example 13 |
|---|---|---|---|---|---|---|---|---|---|
| Average thickness of glass flakes (μm) | 0.7 | 0.7 | 0.3 | 0.3 | 0.7 | 0.7 | 0.3 | 0.3 | 0.7 |
| Average particle diameter of glass flakes (μm) | 10 | 5 | 5 | 3 | 2 | 5 | 5 | 3 | 160 |
| Proportion of deposited surface treatment agent (mass %) | 0.6 | 0.6 | 0.6 | 0.6 | 0.6 | — | — | — | 0.6 |
| Content of coupling agent in surface treatment agent (mass %) | 50 | 50 | 50 | 50 | 50 | — | — | — | 50 |
| Content of binder component in surface treatment agent (mass %) | 50 | 50 | 50 | 50 | 50 | — | — | — | 50 |
| D50 value of glass flakes in resin composition (μm) | 7 | 4 | 4 | 3 | 2 | 4 | 4 | 3 | 48 |
| D90 value of glass flakes in resin composition (μm) | 25 | 12 | 29 | 12 | 4 | 12 | 27 | 12 | 84 |
| D99 value of glass flakes in resin composition (μm) | 44 | 34 | 40 | 34 | 8 | 31 | 44 | 34 | 148 |
| Maximum particle diameter of glass flakes in resin composition (μm) | 61 | 52 | 61 | 37 | 11 | 37 | 61 | 37 | 209 |
| Content of glass flakes in resin composition (mass %) | 20 | 20 | 20 | 20 | 20 | 20 | 20 | 20 | 20 |
| Properties of molded article   Maximum tensile strength (MPa) | 24.0 | 24.0 | 22.5 | 23.2 | 23.7 | 21.6 | 20.8 | 21.9 | 29.0 |
| Maximum flexural strength (MPa) | 41.0 | 40.0 | 38.6 | 39.6 | 39.6 | 37.1 | 37.2 | 37.5 | 52.0 |
| Flexural modulus (MPa) | 1571 | 1464 | 1430 | 1373 | 1448 | 1451 | 1478 | 1220 | 2932 |
| Izod impact strength UN*[1] (kJ/m$^2$) | 60 | 76 | 53 | 92 | 147 | 107 | 62 | 119 | 18 |
| Izod impact strength N*[2] (kJ/m$^2$) | 6.5 | 6.9 | 5.9 | 9.8 | 8.1 | 8.6 | 7.4 | 11.0 | 4.6 |
| Appearance (reflection from flakes) | Not reflected | Not reflected | Not reflected | Not reflected | Not reflected | Not reflected | Not reflected | Not reflected | Not reflected |
| Surface smoothness*[3] | 4 | 4.75 | 4.5 | 4.75 | 5 | 4.25 | 4.5 | 4.5 | 3 |
| Scratch resistance*[4] | 4 | 4.75 | 4.5 | 4.5 | 5 | 4.25 | 4.5 | 4.5 | 3 |

Notes
*[1]Un-notched
*[2]Notched
*[3,4]The surface smoothness and scratch resistance were evaluated on a 5-point scale and those rated as 4 or greater are acceptable.

As shown in Tables 2 and 3, the impact strength, appearance, surface smoothness, and scratch resistance of the resin compositions of Examples 1 to 9 were drastically improved compared to those of Comparative Examples 1 to 13. This result reveals that, a resin molded article obtained from the resin composition of the present invention also has improved appearance, surface smoothness, and scratch resistance. That is, the impact strength, appearance, surface smoothness, and scratch resistance of a resin molded article can be greatly improved by the use of the glass flakes having small particle diameters and defined in the present invention.

Example 10 and Comparative Examples 14 to 18

Glass flakes of Example 10 and Comparative Examples 14 to 18 were obtained by changing the average thickness, average particle diameter, etc. of the glass flakes of Example 1 as shown in Table 4 and changing the binder component in the surface treatment agent solution of Example 1 to an epoxy resin. Moreover, resin compositions of Example 10 and Comparative Examples 14 to 18 were obtained in the same manner as in Example 1, except that the obtained glass flakes, polycarbonate (Iupilon S3000F manufactured by Mitsubishi Engineering-Plastics Corporation), and a fine carbon black powder in amounts of 30 mass %, 68 mass %, and 2 mass %, respectively, were mixed uniformly. The average thickness, average particle diameter, etc. of the glass flakes were changed from those in Example 1 by adjusting the amount of blown air and the rotation speed of rollers in the blow process, crush, and classification. Resin molded articles were produced in the same manner as in Example 1. The various properties of the glass flakes, resin compositions, and resin molded articles were measured in the same manner as in Example 1. The results are shown in Table 4.

TABLE 4

|  |  | Example 10 | Comparative Example 14 | Comparative Example 15 | Comparative Example 16 | Comparative Example 17 | Comparative Example 18 |
|---|---|---|---|---|---|---|---|
| Average thickness of glass flakes ($\mu$m) | | 0.4 | 0.7 | 0.7 | 0.7 | 0.55 | 0.4 |
| Average particle diameter of glass flakes ($\mu$m) | | 10 | 160 | 40 | 20 | 40 | 25 |
| Proportion of deposited surface treatment agent (mass %) | | 0.6 | 0.6 | 0.6 | 0.6 | 0.6 | 0.6 |
| Content of coupling agent in surface treatment agent (mass %) | | 15 | 15 | 15 | 15 | 15 | 15 |
| Content of binder component in surface treatment agent (mass %) | | 85 | 85 | 85 | 85 | 85 | 85 |
| D50 value of glass flakes in resin composition ($\mu$m) | | 9 | 44 | 32 | 17 | 28 | 19 |
| D90 value of glass flakes in resin composition ($\mu$m) | | 22 | 81 | 57 | 49 | 57 | 43 |
| D99 value of glass flakes in resin composition ($\mu$m) | | 37 | 144 | 99 | 93 | 107 | 77 |
| Maximum particle diameter of glass flakes in resin composition ($\mu$m) | | 57 | 188 | 144 | 143 | 134 | 110 |
| Content of glass flakes in resin composition (mass %) | | 30 | 30 | 30 | 30 | 30 | 30 |
| Properties of molded article | Maximum tensile strength (MPa) | 79 | 84 | 84 | 81 | 85 | 70 |
| | Tensile strain (%) | 2.6 | 2.0 | 2.1 | 2.1 | 2.1 | 1.5 |
| | Maximum flexural strength (MPa) | 128 | 139 | 142 | 141 | 141 | 137 |
| | Flexural modulus (MPa) | 5020 | 6213 | 5900 | 5714 | 6322 | 6326 |
| | Izod impact strength UN[*1] (kJ/m$^2$) | 44 | 21 | 24 | 28 | 25 | 29 |
| | Izod impact strength N[*2] (kJ/m$^2$) | 2.5 | 2.0 | 2.0 | 1.8 | 2.3 | 2.1 |
| | Appearance (reflection from flakes) | Not reflected | Not reflected | Not reflected | Not reflected | Not reflected | Not reflected |
| | Surface smoothness[*3] | 4 | 2 | 3 | 4 | 3 | 4 |
| | Scratch resistance[*4] | 4 | 2 | 3 | 3.5 | 3 | 3.5 |

Notes
[*1]Un-notched
[*2]Notched
[*3,4]The surface smoothness and scratch resistance were evaluated on a 5-point scale and those rated as 4 or greater are acceptable.

INDUSTRIAL APPLICABILITY

A resin composition including the glass flakes of the present invention can effectively improve the impact strength, appearance, surface smoothness, and scratch resistance of resin molded articles, and are therefore applicable to various uses. For example, a resin composition including the glass flakes of the present invention is suitably used in fields where a fibrous filler cannot be used because of an emphasis on appearance and surface smoothness and impact strength is seen as important. Examples of the field include the fields of the interior and exterior of automobiles and electronic parts. More specifically, a resin composition including the glass flakes of the present invention is applicable to exterior parts such as an automobile bumper including, for example, polypropylene and interior parts such as an instrument panel.

The invention claimed is:
1. Glass flakes having an average particle diameter of 0.1 to 15 $\mu$m and an average thickness of 0.1 to 2 $\mu$m, wherein the glass flakes have a particle size distribution in which a particle diameter at 99% of a cumulative volume from a smaller particle diameter is 45 μm or less, and a maximum particle diameter of the glass flakes is 62 μm or less, at least a portion of a surface of each of the glass flakes is covered by a surface treatment agent, the surface treatment agent comprises at least one selected from the group consisting of a binder component and a silane coupling agent, and a proportion of a coating composed of the surface treatment agent in the glass flakes is 0.05 to 2 mass %.

2. A resin composition, comprising:

glass flakes; and a matrix resin, wherein the glass flakes have an average particle diameter of 0.1 to 15 μm and an average thickness of 0.1 to 2 μm; and the glass flakes have a particle size distribution in which a particle diameter at 99% of a cumulative volume from a smaller particle diameter is 45 μm or less, and a maximum particle diameter of the glass flakes is 62 μm or less, at least a portion of a surface of each of the glass flakes is covered by a surface treatment agent, the surface treatment agent comprises at least one selected from the group consisting of a binder component and a silane coupling agent, and a proportion of a coating composed of the surface treatment agent in the glass flakes is 0.05 to 2 mass %.

3. The resin composition according to claim 2, wherein the matrix resin is a thermoplastic resin.

4. The resin composition according to claim 3, wherein the thermoplastic resin is at least one selected from the group consisting of polypropylene, polyethylene, polybutylene terephthalate, polyethylene terephthalate, polycarbonate, a polystyrene resin, a styrene-acrylonitrile copolymer resin, a polyacrylate, a styrene-butadiene-acrylonitrile copolymer resin, polyarylene sulfide, polyphenylene sulfide, polyacetal, polyamide, polyamide-imide, a liquid crystal polymer, and polyetheretherketone.

5. The resin composition according to claim 4, wherein the thermoplastic resin is polypropylene.

6. The resin composition according to claim 4, wherein the thermoplastic resin is polycarbonate.

* * * * *

UNITED STATES PATENT AND TRADEMARK OFFICE
CERTIFICATE OF CORRECTION

PATENT NO. : 11,203,546 B2
APPLICATION NO. : 16/609698
DATED : December 21, 2021
INVENTOR(S) : Kato It is certified that error appears in the above-identified patent and that said Letters Patent is hereby corrected as shown below:

In the Specification

Column 3, Lines 45-47, delete "E-glass, can be .............. mass %.".

Column 3, Line 44, after "such as" insert -- E-glass, can be .............. mass % --.

Column 3, Line 53, after "$B_2O_3$" delete "." and insert -- : --.

Column 4, Line 12, delete "JP 1102(1990)" and insert -- JP H02(1990) --.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*